United States Patent [19]

Wilson

[11] Patent Number: 4,796,864
[45] Date of Patent: Jan. 10, 1989

[54] SPRING LOADED DROP FOOT TRAILER JACK

[75] Inventor: James E. Wilson, Chickasha, Okla.

[73] Assignee: Stallion Trailer Kits, Inc., Chickasha, Okla.

[21] Appl. No.: 113,254

[22] Filed: Oct. 26, 1987

[51] Int. Cl.$^4$ ............................................... B60S 9/02
[52] U.S. Cl. ..................................... 254/425; 254/103
[58] Field of Search ............... 254/419, 420, 422, 424, 254/425, 98, 103, 100, 134, DIG. 4; 248/352, 354.5

[56] References Cited

U.S. PATENT DOCUMENTS

| | | |
|---|---|---|
| 1,394,737 | 10/1921 | Keesler . |
| 2,205,436 | 6/1940 | Richards . |
| 2,207,548 | 7/1940 | Maranda ............................ 254/423 |
| 2,565,401 | 8/1951 | Smith ................................. 254/103 |
| 2,939,679 | 6/1960 | Ryan . |
| 3,137,512 | 6/1964 | Carpezzi ............................ 248/352 |
| 3,281,160 | 10/1966 | Vinther et al. . |
| 3,366,361 | 1/1968 | Gostling ............................ 248/354.5 |
| 3,595,527 | 7/1971 | Douglass . |
| 3,873,126 | 3/1975 | Hewett . |
| 4,187,733 | 2/1980 | Walther et al. ..................... 254/419 |
| 4,316,601 | 2/1982 | Osborne et al. . |
| 4,684,097 | 8/1987 | Cox ................................... 248/354.5 |

*Primary Examiner*—Robert C. Watson
*Attorney, Agent, or Firm*—Laney, Dougherty, Hessin & Beavers

[57] ABSTRACT

An apparatus for adjustably supporting a portion of a wheeled vehicle, which apparatus may be retracted or disengaged from a supporting surface when the wheeled vehicle is put into use. A tubular outer housing is provided for attaching to the vehicle, with second and third tubular members slidably disposed therein. A locking mechanism is provided adjacent an aperture in a wall of the second tubular member for positioning a pin in selectively alignable apertures in a wall of the third tubular member, thereby preventing relative movement between the second and third tubular members. A tension spring engaging both second and third tubular members and located within the third tubular member is provided for biasing the third tubular member toward a retracted position with respect to the second tubular member. A cranking rod and threaded screw member are also disclosed for moving the second tubular member with respect to the tubular outer housing.

11 Claims, 2 Drawing Sheets

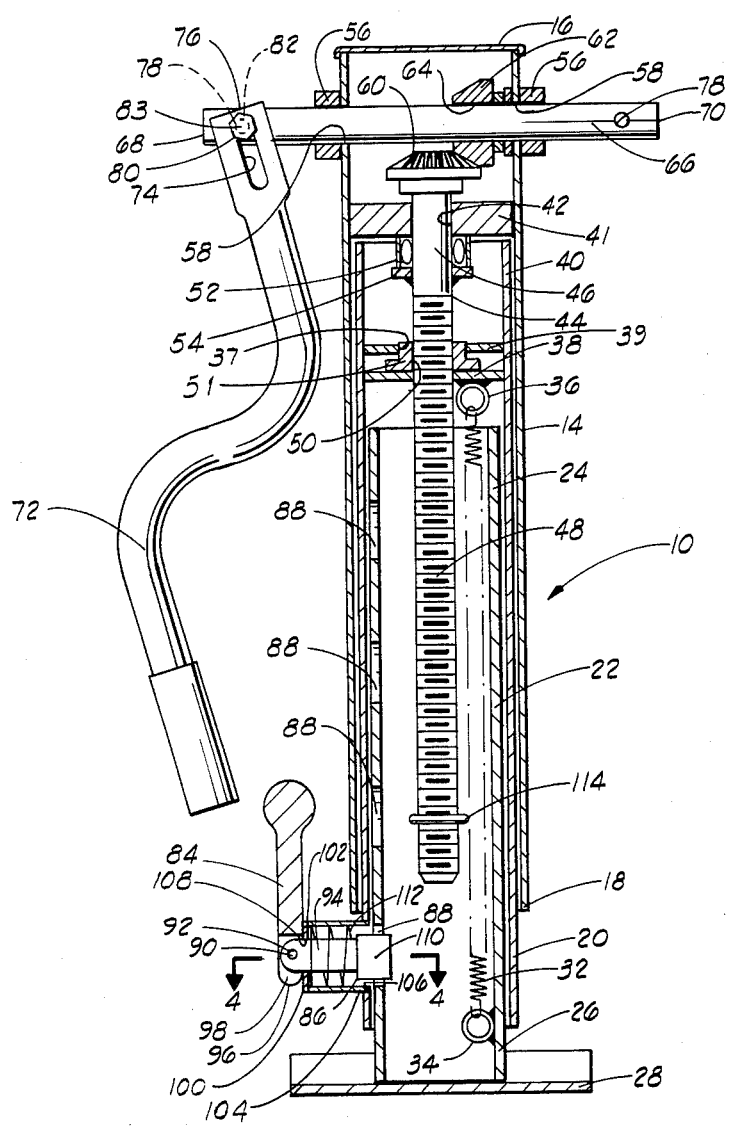
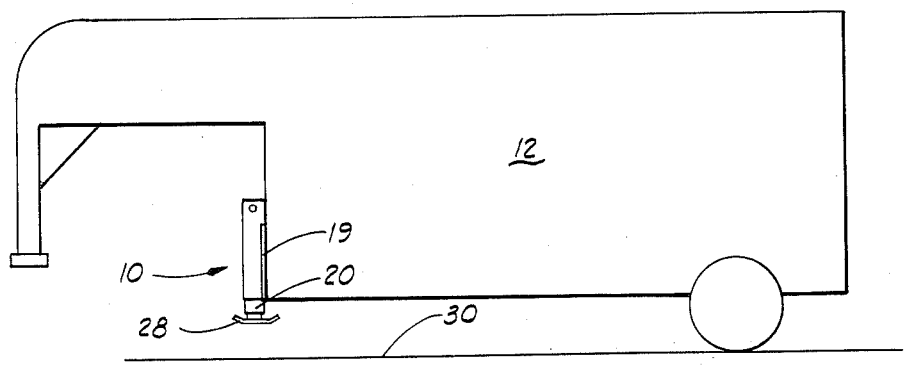

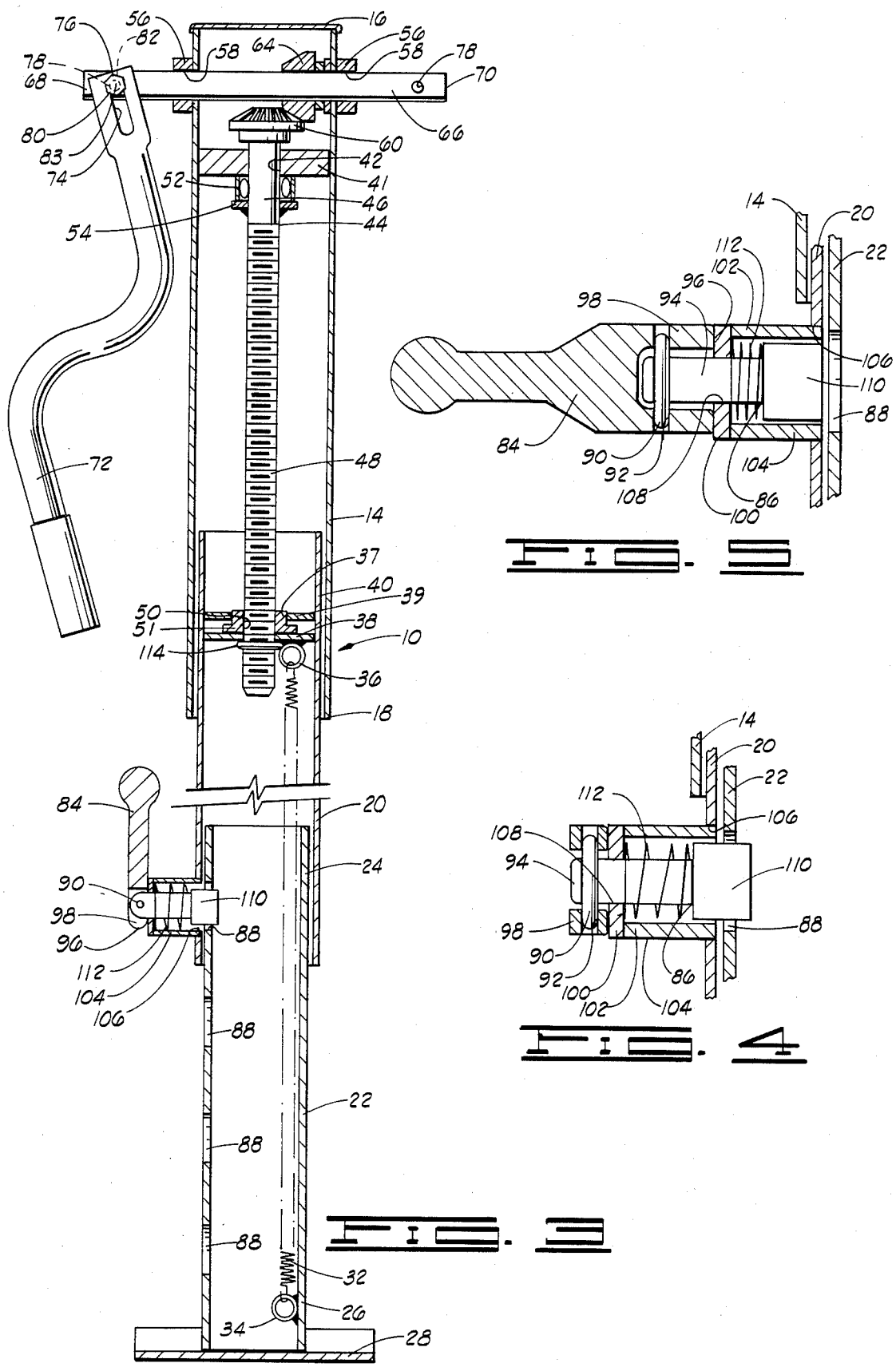

SPRING LOADED DROP FOOT TRAILER JACK

BACKGROUND OF THE INVENTION

1. Field of the Invention

This apparatus relates generally to apparatus for at least partially supporting a portion of a wheeled vehicle and more particularly, but not by way of limitation, to apparatus for adjustably supporting a trailer and which may be retracted or disengaged from the ground or other supporting surface when the trailer is put into use.

2. Description of the Prior Art

Supporting apparatus have utility in facilitating engagement and disengagement of a trailer from a ball or other type trailer hitch mounted on the rear of a truck or automobile. In practice, these apparatus typically provide some means to adjust the height of the trailer above the ground, as with a jack, and to thereby effect or close a vertical separation of the trailer and the usual ball-type trailer hitch. Several such apparatus are disclosed in the prior art. For example, U.S. Pat. No. 2,939,679 to Ryan disclosed a jack mechanism, mounted on the tongue of a trailer-type vehicle, which is vertically retractable when not in use. The jack is disclosed as disposed within a housing member and as engaging a telescoping member slidably received within the housing member. A latch dog is pivotally attached to the housing member, and engages elongated slots in the housing member to bear against a nut which is threaded onto the jack and fits closely within the housing member. Extension of the telescoping member, and a tension spring which is attached to the base plate at the lower end of the telescoping member and to an external portion of the housing member, pass the nut downward past the latch dog and force the top of the nut against the latch dog, thus locking the latch dog into place. Further adjustment of the device is accomplished by rotation of the threaded shaft of the jack through the nut and by bearing of the shaft against a thrust bearing welded across the top of the telescoping member.

Patents to Douglass, U.S. Pat. No. 3,595,527 and Osborne, et al., U.S. Pat. No. 4,216,601, disclose similar devices which employ a tubular support member, with openings disposed therein, attached to the frame of the trailer or other wheeled vehicle. Coarse adjustment of these apparatus is accomplished by positioning ears or radial supporting projections from a first tube slidably disposed in the tubular support member within openings in the tubular support member. Finer adjustments of the apparatus are accomplished by the relative rotation of a jack screw with respect to a second tube slidably disposed within the first tube. The patent to Osborne, et al. also discloses the use of a spring loaded locking mechanism, mounted on the tubular support member, for inserting a pin into selectively alignable openings in the first and second tubes, thereby fixing those tubes into place with respect to the tubular support member and to the frame of the trailer to which the support member is affixed. Patents to Richards, U.S. Pat. No. 2,205,436, and Vinther, et al., U.S. Pat. No. 3,281,160, disclose apparatus employing telescoping tubes and pins which are manually inserted into selectively alignable openings in the tubes.

One of the problems associated with these apparatus as previously disclosed is the absence of convenient means for retracting the innermost telescoping tubular member when any locking means provided are disengaged, and which are durable and not jeopardized by the environment in which the apparatus is employed. For instance, the patents to Osborne et al. and Douglass which were previously discussed require that the user crank or twist something to retract this innermost member from an extended position. The patents to Ryan and to Richards appear to disclose spring means for accomplishing an automatic retraction of the apparatus from a supporting surface, but both spring means are exposed and therefore subject to the influences and interference of the environment.

Such interference can be substantial. For example, an apparatus of the type disclosed in the patents to Ryan and to Richards could be used in a farming operation to support hay wagons or other tractor attachments, where dirt could become caked on the spring or otherwise interfere with the operation of the spring. Such apparatus could also be employed to support a boat trailer, where exposure to water, and particularly salt water, could quickly compromise the utility of such spring means as disclosed in the patents to Ryan and to Richards. The biasing means of the present invention, in contrast, is disclosed as protected from the environment within a third tubular support member, which is in turn slidably disposed within two other tubular members.

Another need not met by the prior art is the provision of a locking mechanism which is variably positionable with respect to the frame or other portion of the vehicle to be supported and which further is conveniently actuated, though the patent to Vinther, et al. does disclose the use of a manually inserted pin which is variably positionable with respect to the frame or other portion of the vehicle to be supported.

The present invention overcomes the shortcomings of the prior art by providing a novel and improved spring loaded drop foot trailer jack which permits coarse and fine adjustment for the height above a supporting surface, which may be locked into a desired position, and which provides means for automatically retracting the jacking apparatus from engagement with the supporting surface with minimal exposure to interference from the environment.

SUMMARY OF THE INVENTION

The trailer jack of the present invention comprises a tubular outer housing for attaching to the wheeled vehicle to be supported and having an upper end and an open lower end, a second tubular member slidably disposed within the tubular outer housing, a third tubular member slidably disposed within the second tubular member, biasing means located within the third tubular member for biasing the third member toward a retracted position with respect to the second member, locking means for preventing movement be-tween the second and third tubular members when actuated, and a vehicle support member attached to a lower portion of the third tubular member.

The locking means comprises a pin case extending from a wall of the second tubular member adjacent an aperture in the wall, a pin which is slidably disposed in the pin case and which has a first portion and an enlarged second portion, and a plate, adjacent an end of the pin case, with an aperture defined in the plate for allowing passage of the first portion of the pin, but preventing the enlarged portion from passing from the pin case. The locking means of the apparatus also comprises a lever pivotally engaging the first portion of the pin and movable from a first position wherein the pin engages one of a series of spaced openings in the wall of the third tubular member, to a second position wherein the pin is removed from engagement with the opening, and includes a spring abutted against the plate and against the enlarged second portion of the pin.

BRIEF DESCRIPTION OF THE DRAWINGS

FIG. 1 is a cross-sectional view, showing the spring loaded drop foot trailer jack of the present invention fully retracted.

FIG. 2 is a side elevational view showing a portion of a wheeled vehicle with the spring loaded drop foot trailer jack of the present invention attached.

FIG. 3 is a cross-sectional view of the spring loaded drop foot trailer jack of the present invention fully extended.

FIG. 4 is a cross-sectional view taken along lines 4—4 in FIG. 1 showing a locking means of the preferred embodiment of the present invention, showing a lever, pin and spring with the lever in its first position.

FIG. 5 is a cross-sectional view taken along lines 4—4 in FIG. 1 showing the locking means with the lever in its second position.

DETAILED DESCRIPTION OF THE PREFERRED EMBODIMENT

Referring now to the drawings, and more particularly to FIGS. 1 and 2, the spring loaded drop foot trailer jack of the present invention is shown and generally designated by the numeral 10. In the preferred embodiment shown, the trailer jack 10 is adapted for supporting a portion of a wheeled vehicle, such as trailer 12, and comprises a tubular outer housing 14 having an upper end 16 and an open lower end 18. Brackets 19 are used to attach outer housing 14 to trailer 12 in a manner known in the art. A second tubular member 20 is slidably disposed in the tubular outer housing 14, and is extended from and retracted into the tubular outer housing 14 through its open lower end 18. A third tubular member 22, having an upper portion 24 and a lower portion 26, is slidably disposed within the second tubular member 20. A vehicle support member such as a plate 28 is attached to the lower portion 26 of the third tubular member 22 for engaging a supporting surface 30 such as the ground when in use.

The trailer jack 10 of the present invention is movable from a fully retracted state, as shown in FIG. 1, to a fully extended state, as shown in FIG. 3, by the use of a combination of biasing means and locking means for moving the third tubular member 22 with respect to the second tubular member 20, and of a combination of connecting means and extending means for moving the second tubular member 20 with respect to the tubular outer housing 14. Referring again to FIG. 1, the biasing means of the preferred embodiment comprises a tension spring 32 which is connected to a lower ring 34 connected to the lower portion 26 of the third tubular member 22. The tension spring 32 is connected also to an upper ring 36 which is connected to a plate 38 secured to an upper portion 40 of the second trailer member 20. Detailed discussion of the locking means of the preferred embodiment is deferred until a description of the operation of the jack can be undertaken in conjunction with FIGS. 4 and 5.

The connecting means of the preferred embodiment comprises a screw support plate 41 having a hole 42 defined therein and which is secured to the tubular outer housing, a threaded screw member 44 having a unthreaded portion 46 rotatably received in hole 42 and a threaded portion 48 threadingly received in a threaded hole 50 defined in a nut 51 held between plates 38 and 39, and the plates 38 and 39. The nut 51 is prevented from rotating with respect to the second tubular member 20 by a close fitting engagement with a hole 37 defined in the plate 39, which plate is secured also to an upper portion 40 of the second tubular member 20. It will be seen that rotation of the threaded screw member 44 moves the plates 38 and 39 and thus the second tubular member 20 upwardly or downwardly with respect to the tubular outer housing 14. A bearing 52 and a ring 54 are provided also for guiding the rotation of the threaded screw member 44 in conjunction with the screw support plate 40.

The extending means of the preferred embodiment shown in FIGS. 1 and 3 accomplishes the rotation of the threaded screw member 44, as just discharged, and comprises a bushing 56 disposed adjacent each of a pair of opposing transverse openings 58 defined in the tubular outer housing 14 adjacent its upper end 16, and a first bevel gear 60 attached to the threaded screw member 44. A second bevel gear 62 engages the first bevel gear 60 and has a hole 64 defined therein aligned with the bushings 56. A cranking rod 66 having first and second ends 68 and 70, respectively, is disposed through the bushings 56 and through the hole 64 defined in the second bevel gear 62, and is secured to the second bevel gear for preventing relative movement therebetween.

The cranking rod 66 is rotated by rotating means comprising a handle 72 having an aperture 74 defined in a first end 76 thereof. This aperture 74 is aligned with a hole 78 defined in the first end 68 of the cranking rod 66, and a bolt 80 is disposed through the aperture 74 and hole 78. A nut 82 located opposite the head portion 83 of the bolt 80 threadingly engages the bolt 80 and holds the handle 72 adjacent the first end 68 of the cranking rod 66.

Alternatively, the handle 72 may be similarly disposed adjacent the second end 70 of the cranking rod 66 by alignment of the aperture 74 with the hole 78 in the second end 70. Whether attached to either end an extension (not shown) of a kind known in the art may be connected to rod 66 to clear trailer 12 as necessary with handle 72 mounted on the extension.

In operation, the locking means of the present invention and the structure recited above make the trailer jack of the present invention amenable to coarse and fine height adjustments with respect to the supporting surface 30. Referring specifically to FIGS. 4 and 5, coarse height adjustments of the preferred embodiment require first the movement of a lever 84 from a first position shown in FIG. 4, wherein a pin 86 engages one of a series of spaced openings 88 in a wall of third tubular member 22, to a second position shown in FIG. 5 wherein the pin 86 is removed from engagement with any of the openings 88. These positions and corresponding conditions are further illustrated in relation to the whole of the trailer jack 10 in FIGS. 1 and 3.

Returning again to FIGS. 4 and 5, in the course of the movement of the lever 84 from the first position shown in FIG. 4 to the second position shown in FIG. 5, the lever 84 will pivot about a pivot pin 90 in a hole 92 in a first portion 94 of the pin 86, to bring the ends 96 of the ears 98 into abutment with a plate 100. The plate 100 is adjacent an end 102 of a pin case 104, which pin case 104 is in turn adjacent an aperture 106 defined in a wall of the second tubular member 20. The plate 100 has an aperture 108 defined therein for passage of the first portion 94 therethrough, but preventing passage of a second enlarged portion 110 of the pin 86, so that bringing the ends 96 of the ears 98 of the lever 84 into abutment with the plate 44 pulls the first portion 94 of pin 86 through the aperture 108. This action is resisted by a compression spring 112, which bears against the second enlarged portion 110 of the pin 86 and against the plate 100.

Extension of the third tubular member 22 with respect to the second tubular member 20 then requires the stretching of the tension spring 32, as by the placing of downward pressure on the plate 38. The pin 86 may then be moved into engagement once again with an opening 88 in the third tubular member 22 which has been selectively aligned with the aperture 106 in the second tubular member 20, to secure the second and third tubular members 20 and 22, respectively, from relative movement therebetween. Retraction of the third tubular member 22 with respect to the second tubular member 20 is automatically accomplished by the tension spring 32 located within the third tubular member 22 with a minimum of interference from the environment in which the trailer jack is used, when the pin 86 is removed from engagement with an opening 88 of the third tubular member 20 as described above.

In making fine adjustments of the trailer jack, the user cranks the cranking rod 66 using the handle 72, thus rotating a second bevel gear 62, which rotates the first bevel gear 60 and the threaded screw member 44 to which the first bevel gear 60 is attached, which creates an upward or downward force on the plates 38 and 39 and on the second tubular member 20 to which the plates 38 and 39 are secured. Downward movement of the second tubular member 20 with respect to the tubular outer housing 14 is limited by a pin 114 in the threaded portion 48 of the threaded screw member 44, as shown in FIG. 3.

By the methods for coarse and fine adjustment just described, the user may easily retract the trailer jack completely, as shown in FIG. 1, or may with equal ease extend the trailer jack apparatus fully, as shown in FIG. 3, with a minimum of interference from the environment in which the appar;atus is used. Contributing to the ease of operation is the provision of a locking mechanism which is variably positionable with respect to the frame or other portion of the vehicle to be supported, and which is conveniently actuated. Thus, the present invention is well adapted to carry out the objects and attain the ends and advantages mentioned above as well as those inherent therein. While a preferred embodiment of the invention has been described for the purpose of this disclosure, numerous changes in the construction and arrangement of parts may be made by those skilled in the art, which changes are encompassed within the spirit of this invention as defined by the appended claims.

What is claimed is:

1. An apparatus for at least partially supporting a portion of a wheeled vehicle, said apparatus comprising:
   a tubular outer housing for attaching to said vehicle and having an upper end and an open lower end;
   a second tubular member slidably disposed within said tubular outer housing, said second tubular member defining an aperture in a wall thereof;
   a third tubular member having upper and lower portions and slidably disposed within said second tubular member, said third tubular member defining a series of spaced openings in a wall thereof selectively alignable with said aperture in said second tubular member;
   biasing means located within said third tubular member for biasing said third tubular member toward a retracted position with respect to said second tubular member;
   locking means for securing said second and third tubular members from relative movement therebetween when said locking means is actuated, said locking means comprising:
      a pin case extending from a wall of said second tubular member adjacent said aperture;
      a pin slidably disposed in said pin case and having a first portion and an enlarged second portion;
      a plate with an aperture defined therein for allowing passage of said first portion of said pin therethrough, and preventing passage of said enlarged second portion of said pin from said pin case, adjacent an end of said pin case;
      a lever pivotally engaging said first portion of said pin, and movable from a first position wherein said pin engages one of said openings in said third tubular member to a second position wherein said pin is removed from engagement with said one of said openings; and
      a spring abutted against said plate and said enlarged second portion of said pin; and
   a vehicle support member attached to said lower portion of said third tubular member.

2. An apparatus as described in claim 1, further comprising:
   connecting means for connecting said second tubular member and said tubular outer housing; and
   extending means for extending and retracting said second tubular member with respect to said tubular outer housing.

3. An apparatus as described in claim 2, wherein said connecting means comprises:
   a screw support plate having a hole defined therein and secured to said tubular outer housing;
   a screw member having a portion rotatably received in said hole in said screw support plate; and
   a nut having a threaded hole defined therein for threaded engagement with said screw member and secured from rotation with respect to said second tubular member.

4. An apparatus as described in claim 3, wherein:
   said tubular outer housing defines opposite transverse openings; and
   said extending means comprises:
      a bushing disposed adjacent each of said opposite openings in said tubular outer housing;
      a first bevel gear attached to said screw member;
      a second bevel gear engaging said first bevel gear and having a hole defined therein aligned with said bushings;
      a cranking rod, having first and second ends, disposed through said bushings and said hole in said second bevel gear and secured to said second bevel gear for preventing relative movement therebetween; and
      rotating means for rotating said cranking rod and said second bevel gear.

5. An apparatus as described in claim 4, wherein:
   said first end of said cranking rod defines a hole therein; and said rotating means for rotating said cranking rod comprises:
  a handle having first and second ends, said first end having an aperture defined therein;
  a bolt disposed through said hole defined in said first end of said cranking rod and through said aperture in said first end of said handle; and
  a nut threadingly engaging said bolt and holding said handle adjacent said cranking rod.

6. An apparatus as described in claim 3, further comprising:
  a plate secured to said upper portion of said second tubular member;
  an upper ring, attached to said plate; and
  a lower ring, attached to said lower portion of said third tubular member; and
  wherein said biasing means comprises a tension spring engaging both upper and lower rings.

7. A jacking apparatus for a wheeled vehicle, said apparatus comprising:
  a tubular outer housing for attaching to said vehicle, and defining opposing transverse openings therein;
  a second tubular member, having an aperture defined in a wall thereof and an upper portion, slidably disposed within said tubular outer housing;
  a screw support plate having a hole defined therein and secured to said tubular outer housing;
  a threaded screw member, having an unthreaded portion rotatably received in said hole in said screw support plate and a threaded portion;
  a nut having a threaded hole defined therein for threadingly receiving said threaded portion of said screw member and secured from rotation with respect to said second tubular member;
  a pair of opposing bushings adjacent said opposing openings in said tubular outer housing;
  a first bevel gear attached to said threaded screw member;
  a second bevel gear engaging said first bevel gear and having a hole defined therein aligned with said bushings;
  a cranking rod having first and second ends and disposed through said bushings and said hole in said second bevel gear, said first end of said cranking rod defining a hole therein;
  a handle connected to said cranking rod;
  a third tubular member, having upper and lower portions, and slidably disposed within said second tubular member, said third tubular member defining a series of vertically spaced openings in a wall thereof selectively alignable with said aperture in said second tubular member;
  biasing means located within said third tubular member for biasing said third tubular member toward a retracted position with respect to said second tubular member;
  a pin case extending from a wall of said second tubular member adjacent said aperture in said second tubular member;
  a pin slidably disposed in said pin case;
  a plate adjacent an end of said pin case and with an aperture defined therein for passage of a portion of said pin therethrough;
  a lever pivotally engaging said portion of said pin, and movable from a first position wherein said pin engages one of said openings in said third tubular member to a second position wherein said pin is disengaged from said opening; and
  a vehicle support member attached to said lower portion of said third tubular member.

8. An apparatus as described in claim 7, further comprising:
  a plate secured to said upper portion of said second tubular member;
  an upper ring attached to said plate; and
  a lower ring attached to said lower portion of said third tubular member;
  wherein, said biasing means comprises a tension spring engaging both upper and lower rings.

9. An apparatus for at least partially supporting a portion of a wheeled vehicle, said apparatus comprising:
  a tubular outer housing for attaching to said vehicle, and having an uppwer end and an open lower end;
  a second tubular member defining an aperture in a wall thereof and having an upper portion, said second tubular member being slidably disposed within said tubular outer housing;
  a third tubular member defining a series of spaced openings in a wall thereof selectively alignable with said aperture in said second tubular member and having upper and lower portions, said third tubular member being slidably disposed within said second tubular member;
  locking means for securing said second and third tubular members from relative movement therebetween when said locking means is actuated, said locking means being variably positionable with respect to said tubular outer housing and comprising:
    a pin case extending from a wall of said second tubular member adjacent said aperture;
    a pin slidably disposed in said pin case and having a first portion and an enlarged second portion;
    a plate having an aperture defined therein for allowing passage of said first portion of said pin therethrough, and preventing passage of said enlarged second portion of said pin from said pin case, adjacent an end of said pin case;
    a lever pivotally engaging said first portion of said pin, and movable from a first position wherein said pin engages one of said openings in said third tubular member to a second position wherein said pin is removed from engagement with said one of said openings; and
    a spring abutted against said plate and said enlarged second portion of said pin; and
  a vehicle support member attached to said lower portion of said third tubular member.

10. An apparatus as described in claim 9, further comprising:
  biasing means for biasing said third tubular member toward a retracted position with respect to said second tubular member.

11. An apparatus as described in claim 10, further comprising:
  a plate secured to said upper portion of said second tubular member;
  an upper ring attached to said plate; and
  a lower ring attached to said lower portion of said third tubular member;
  wherein, said biasing means comprises a tension spring engaging said upper and lower rings.

* * * * *

UNITED STATES PATENT AND TRADEMARK OFFICE
CERTIFICATE OF CORRECTION

PATENT NO. : 4,796,864
DATED : January 10, 1989
INVENTOR(S) : James E. Wilson

It is certified that error appears in the above-identified patent and that said Letters Patent is hereby corrected as shown below:

Column 1, line 22, delete "disclosed" and insert discloses-- therefor.

Column 2, line 54, delete "be-tween" and insert --between-- therefor.

Column 3, line 60, delete "trailer" and insert --tubular-- therefor.

Column 4, line 18, delete "discharged" and insert --discussed-- therefor.

Column 8, line 18, delete "uppwer" and insert --upper-- therefor.

Signed and Sealed this

Twenty-third Day of May, 1989

Attest:

DONALD J. QUIGG

*Attesting Officer*  *Commissioner of Patents and Trademarks*